United States Patent [19]

Parker et al.

[11] Patent Number: 4,767,671
[45] Date of Patent: Aug. 30, 1988

[54] COATED ARTICLES AND METHODS FOR THE PREPARATION THEREOF

[75] Inventors: Robert S. R. Parker, Bishop's Stortford; John G. B. Howes, Hertford Heath, both of United Kingdom

[73] Assignee: Smith and Nephew Associated Companies, P.L.C., England

[21] Appl. No.: 49,292

[22] PCT Filed: Aug. 20, 1986

[86] PCT No.: PCT/GB86/00497
§ 371 Date: Apr. 15, 1987
§ 102(e) Date: Apr. 15, 1987

[87] PCT Pub. No.: WO87/01111
PCT Pub. Date: Feb. 26, 1987

[30] Foreign Application Priority Data

Aug. 20, 1985 [GB] United Kingdom ............... 8520838
Aug. 20, 1985 [GB] United Kingdom ............... 8520839

[51] Int. Cl.$^4$ .............................................. A61F 1/16
[52] U.S. Cl. ............................. 428/412; 428/423.3; 428/423.7; 428/913; 428/480; 528/66; 528/76; 528/77
[58] Field of Search ............ 428/412, 423.3, 480, 428/423.7, 913; 528/66, 76, 77; 427/389.7, 393.5

[56] References Cited

U.S. PATENT DOCUMENTS

| | | | |
|---|---|---|---|
| 3,862,261 | 1/1975 | Stoddard | 428/412 |
| 3,935,367 | 1/1976 | Merrill et al. | 428/336 |
| 3,975,350 | 8/1976 | Hudgin et al. | 428/217 |
| 4,018,939 | 4/1977 | Merrill et al. | 427/165 |
| 4,079,160 | 3/1978 | Philipson | 260/30.4 |
| 4,080,476 | 3/1978 | Laskey | 428/412 |
| 4,435,450 | 3/1984 | Coleman | 427/385.5 |
| 4,534,355 | 8/1985 | Potter | 204/403 |
| 4,663,233 | 5/1987 | Beavers | 428/412 |
| 4,666,758 | 5/1987 | Hunter et al. | 428/412 |

FOREIGN PATENT DOCUMENTS

| | | |
|---|---|---|
| 0077168 | 4/1983 | European Pat. Off. |
| 86/00497 | 8/1986 | PCT Int'l Appl. |
| 1260948 | 7/1969 | United Kingdom |

*Primary Examiner*—Edith Buffalow
*Attorney, Agent, or Firm*—Jacobs & Jacobs

[57] ABSTRACT

Glass or plastics substrates which in use are susceptible to misting and which have on at least one surface thereof an antimist coating. The coating is formed from a hydrophilic polymer which comprises a hydrophilic polyurethane which contains from 35 to 60% by weight of water when hydrated and which has a thickness of from 3 μm to 50 μm in its anhydrous state. Substrates in which the coating comprises a first layer formed from a polyurethane which contains from 0 to 35% by weight of water when hydrated and in which a second and subsequent layers are formed from a polyurethane which contains 60 to 90% by weight of water are also described. Methods for forming the coatings are also described.

4 Claims, No Drawings

COATED ARTICLES AND METHODS FOR THE PREPARATION THEREOF

The present invention relates to an antimist coating for glass or plastics substrates such as polycarbonate substrates which in use are susceptible to misting and to methods for applying such coatings. More particularly the invention relates to antimist coatings formed from hydrophilic polyurethanes.

The problem of the misting of automobile, train and aeroplane windows, as well as of lenses used in eye glasses, safety glasses, binoculars and cameras and of safety visors and other transparent surfaces made of glass or plastics such as polycarbonate is well known. The occurrence of misting is particularly dangerous when the substrate involved forms part of a safety device, such as safety goggles, glasses, screens or visors in which misting of the substrate by moist breath or external water vapour can lead to accidents. There is therefore a requirement for a transparent antimist coating having high light transmission and minimal optical distortion. Antifogging coatings formed from hydrophilic polyacrylate polymers and copolymers have been described in for example British Pat. Nos. 1205767, 1260948 and 1498345, and U.S. Pat. Nos. 3,488,215, 3,515,579, 3,520,949 and 3,635,756. However, such coatings have not been found to be entirely satisfactory through suffering from one or more of the following disadvantages (a) that when hydrated the coatings were soft and were therefore susceptible to abrasion and scratching both in use and when being cleaned; (b) that when saturated the coating was not sufficiently well adhered to the substrate and readily delaminated. This was particularly true when the substrate was glass or a plastics substrate such as polycarbonate, a particularly severe disadvantage in the case of the latter substrate as polycarbonate is widely used in safety goggles, visors and screens because of its high impact resistance; (c) the curing temperature required for the coating process involving acrylates is high, usually in excess of 80° C. which is expensive to operate and requires long heating and cooling periods which makes the process of manufacturing slow: (d) when dry and not plasticised by absorbed water, the coatings were relatively brittle and were susceptible to cracking if flexed.

U.K. Pat. No. 1423269 and U.S. Pat. Nos. 4,018,939 and 3,935,367 disclose nonfogging film coatings comprising a block copolymer containing alternating blocks of polyurethane and hydrophilic polyacrylate. The copolymer is adhered to the substrate by subjecting the substrate to a controlled exposure to UV irradiation either before or after the nonfogging coating has been cast onto it. The coatings used in the present invention do not require this extra manufacturing step.

U.S. Pat. No. 4,467,073 and International Patent Application No. WO 86/00916 describe an anti-fog liquid coating composition formed by complexing or reacting surfactants with hydrophilic polymers which has been cross linked with isocyanate prepolymers. The hydrophilic polymers employed include polyvinyl-pyrrolidone and copolymers thereof and polydimethylacrylamide. The patents do not disclose or suggest the use of hydrophilic polyurethanes as is required in the present invention. The patents do not disclose hydrophilic polymers having the water content, when hydrated, of the hydrophilic polyurethanes used in the present invention. The hydrophilic polyurethanes used in the present invention do not contain or require the presence of surfactants to be effective.

U.S. Pat. Nos. 4,079,160 and 4,435,450 describes abrasion resistant polyurethane coatings which may be applied to glass or polymeric substrates. However, antifogging coatings or the use of hydrophilic polyurethanes is not disclosed or suggested.

U.S. Pat. Nos. 4,156,067 and 4,255,550 describe polyurethane polyether resins which contain carboxylic acid groups and hydroxyl groups in the polymer back bone. Such polyurethanes are described as being suitable inter alia as antifog coatings. However, these polymers are described as being soluble under alkaline conditions which may preclude their use on substrates which are likely to come into contact with alkali that is for example when the substrate is being cleaned.

U.S. Pat. No. 3,975,350 suggests that cross-linked hydrophilic polyurethanes may be used as anti-fog coatings but does not disclose the hydrophilic polyurethanes having the water content range required for use in the present invention. This patent does not disclose the specific substrates which are suitable for coating with hydrophilic polyurethanes.

Surprisingly it has been found that by using a hydrophilic polyurethane which will contain from 35 to 60% water when hydrated to form the coating on a plastics substrate or glass substrate not only is an effective antimist coating formed which is resistant to spoiling by abrasion, it is also highly adherent to the substrate both when wet and when dry. Such coatings are especially effective when used in conjunction with a polycarbonate or polyester substrate. The low cure temperatures required by the use of polyurethane provides a cheaper and quicker manufacturing process.

The hydrophilic polyurethanes for use in the present invention will not be water soluble, water dispersable or otherwise degraded by water and will not be affected by aqueous alkaline cleaning solutions such as ammonia. Surprisingly the polyurethanes used in the invention are able to fulfil these criteria without requiring to be copolymerised with other hydrophilic monomers or require special curing processes such as irradiation or crosslinking.

Accordingly the present invention provides a glass substrate which in use is susceptible to misting which has on at least one surface thereof an antimist coating of a hydrophilic polymer characterised in that the coating is formed from a hydrophilic polyurethane which contains from 35 to 60% by weight of water when hydrated and has a thickness of 3 $\mu$m to 50 $\mu$m in its anhydrous state.

In a second aspect the present invention provides a plastics substrate which in use is susceptible to misting which has on at least one surface thereof an antimist coating of a hydrophilic polymer characterised in that the coating is formed from a hydrophilic polyurethane which contains from 35 to 60% by weight of water when hydrated and has a thickness of 3 $\mu$m to 50 $\mu$m in its anhydrous state.

Suitably the thickness of the coating will be from 3 to 50 $\mu$m, more suitably will be from 3.5 to 40 $\mu$m and preferably 4 to 20 $\mu$m, for example 6 $\mu$m, 8 $\mu$m, 10 $\mu$m, 15 $\mu$m or 20 $\mu$m. The thickness of the coating on the substrate will depend upon the end use to which the substrate is to be put as it is clear that the thicker the coating the more water can be absorbed and the longer the time will be before the coating is saturated. The thickness given hereinbefore are those which are most suitable for most uses, giving a coating of good light transparency and optical clarity and of satisfactory adhesion to the substrate.

Suitably the hydrophilic polyurethanes used as coatings on the glass or plastics substrates of the invention will be capable of both absorbing and desorbing the water vapour quickly. Favourably the coating when exposed to water vapour should fog over and clear within 5 seconds at ambient temperature, that is about 20° C. The speed with which the antimist property of the coating is manifest varies with the temperature of the environment in which it operates. It has been found that hydrophilic polyurethanes which contain from 35 to 60% by weight of water when hydrated are particularly suitable as coatings in the present invention. Most suitably the hydrophilic polyurethane will contain 37.5 to 55.0% water when hydrated and preferably 40 to 50%, for example 40%, 45% 48% and 50%.

Hydrophilic polyurethanes which may be used as coatings in the present invention will be any of those which have the water content as hereinbefore described. The saturation water content of the hydrophilic polyurethane will not however be such as to cause it to delaminate from the substrate. Favoured hydrophilic polyurethanes for use in the invention are those which are linear, that is are substantially free of cross-links and which therefore are soluble in organic solvents.

The hydrophilic polyurethanes suitable for use as coatings in the present invention may be polyether or polyester polyurethanes. Suitable polyesters which give rise to polyurethanes include polyesters of adipic acid such as butylene adipate. However it is preferred to use hydrophilic polyurethanes which are polyether polyurethanes. It is particularly preferred therefore to use hydrophilic polyurethanes which are linear polyether polyurethanes.

Apt linear polyether polyurethanes may be random polymers containing ether units derived from diolic compounds which have been reacted with diisocyanates. Suitable linear polyether polyurethane include those described in European Patent Application No. 50035 at page 12 line 1 to page 14 line 10 and at page 32 line 7 to 33 line 12, which are incorporated herein by cross-reference and which have the required water content when hydrated.

Particularly apt is a linear polyether polyurethane which employs poly(ethylene glycol) derived blocks alone together with a chain extender and a dissocyanate. Suitably the poly(ethylene glycol) may have a molecular weight of between 600 and 6000 and more suitably of between 800 and 2000. A particularly preferred poly(ethylene glycol) has a molecular weight of 1540. Suitably the chain extender will be an aliphatic diol or diamine or amineol containing up to 10 carbon atoms and most suitably up to 4 carbon atoms. Suitably the diisocyanate is an aromatic or aliphatic or alicyclic diisocyanate such as toluene diisocyanate, 1,6-hexamethylene diisocyanate or 4,4'-dicyclohexyl-methane diisocyanate. A preferred diisocyanate is 4,4'-dicyclohexylmethane diisocyanate.

The substrates which are coated by the hydrophilic polyurethanes are plastics materials and glass. Suitable plastics materials include polycarbonates including 4,4'-isopropylidine diphenol polycarbonate and other polycarbonates described in U.S. Pat. No. 3,305,520 and poly[diethylene glycol bis(allyl carbonate)], commonly known as CR39 (Trade mark), polyesters for example poly(oxy-1,2-ethanediyl oxycarbonyl-1,4-phenylene carbonyl) commonly known as Melinex (Trade mark) cellulose esters for example cellulose acetate, polymethyl methacrylate, polyamides, for example those which have high impact resistance such as nylon 11. It is also envisaged that substrates of plastics materials may be coated on one or both surfaces with a hydrophilic polyurethane.

A further special advantage of using an antimist coating of a hydrophilic polyurethane on a polyester material such as Melinex, is that the combination can be used in place of glass in greenhouses and double glazing. In the case of greenhouses it is particularly useful because the glass or uncoated plastics used as glazing in them is susceptible to to condensation which reduces the transmission of actinic radiation through the glazing. By using a coating of hydrophilic polyurethane the glazing stays clear and as a result means the greenhouses using the glazing treated in this way may be used more effectively even in more northerly latitudes.

The glass substrate may be in the form of tempered glass, plate glass or safety glass.

When the substrate used is glass, then the adhesion of the hydrophilic polyurethane to the glass may be improved still further by use of a silane sealant or coupling agent which strengthens the bond between the glass and the polyurethane. Suitable silanes include aminosilanes, mercaptosilanes and epoxysilanes. Preferred are aminosilanes and epoxysilane such as, gammaglycidoxypropyltrimethoxy silane (known as Union Carbide A-187, Trade mark) and gamma-aminopropyltriethoxysilane (known as Union Carbide A-1100, Trade mark).

The coupling agent may be applied to the glass surface as a primer coat and the polyurethane applied on top of this coat or preferably it can be incorporated into the polyurethane at 1 to 5% w/w and the two compounds applied together.

The special advantages of using an antimist coating of a hydrophilic polyurethane is (a) its adhesion under both dry and wet conditions, (b) no delamination under application of shear, (c) high resistance of flexural failure, (d) does not affect impact resistance of polycarbonate to which it is applied (e) is tough and resistant to marring and (f) is effective in temperatures from −40° C. to 100° C. The process of applying the coating has the advantages that the polymer is applied as a polymer and is not polymerised and/or cross-linked in situ and that the coating is 'cured' at room temperature leading to cheaper and quicker production of coated substrates.

To be usable as an effective antimist coating, the coating must fog over and then clear within 5 seconds, that is the coating must both absorb and desorb water quickly. The rate at which absorption and desorption will occur is dependent upon temperature.

The coating when in the form of a hydrophilic polyurethane coating does not exhibit chromatic aberations, haze or discolouration and does not effect the light transmission of the substrate to which it is applied. The coating is also unaffected by ultraviolet light, and mild acid and alkali vapours which may be met in an industrial environment.

The coating when in the form of a hydrophilic polyurethane coating is hard enough to resist embedding by small hard particles such as dust and is capable of resisting marring due to the impact caused by dropping onto the surface a metallic ball from up to 6 feet (1.83 meter) away.

The coating when in the form of a hydrophilic polyurethane coating is hard enough to resist abrasion by blunt objects and thus provides a measure of protection to plastics such as polycarbonates and in particular poly[diethylene glycol bis(allylcarbonate)] which uncoated is soft and easily scratched.

The coated substrates of this invention may be prepared by conventional methods of coating surfaces such as dip coating, spraying, painting, knife-coating, on line coating or by printing. In such processes the hydrophilic polyurethane is dissolved in a suitable organic solvent, for example as a 1 to 15% solution (by weight) or more aptly as a 4 to 8% solution for dip coating and 1 to 4% for spray coating. Suitable organic solvents include halogenated hydrocarbons such as methylene dichloride, alkanols such as methanol or ethanol (optionally containing small amounts of water), ketones such as acetone or methyl ethylketone, 2-methoxyethanol or mixtures of these solvents. Preferred solvents are industrial methylated spirits (IMS) or IMS together with 2 methoxyethanol in a ratio of 3:1. Normally and preferably the hydrophilic polyurethane will be applied in its non-hydrated state.

When the coating is to be used in a high quality optical product, such as on a lens, it is preferred that the coating is applied as the result of dip coating. In this process the solution of the polymer is placed in a suitable container which is raised mechanically in a controlled manner to immerse the substrate. The container is then lowered at an appropriate rate to give the desired coating thickness. The thickness of the coating depends upon both the solution strength, the viscosity of the solution and the rate of withdrawal of the substrate from the container. Favourably the process is carried out at between 15° and 30° C. The solvent is removed from the coating after withdrawal from the solution using a current of air and preferably a current of warm air at a temperature of 50° to 70° C. Drying at this temperature imparts a gloss to the coating thereby presenting a better optical appearance to the coated substrate.

It is possible, through not preferred, to apply a coating by preforming the thin film of the hydrophilic polyurethane and adhering it to the surface of the glass or plastics substrate which is required to be rendered antimisting. Aptly, the thin film may be adhered by means of a transparent adhesive which is inert to the film and the substrate.

In a further aspect therefore the present invention provides a process for forming on at least one surface of plastics substrate an antimist coating of a hydrophilic polymer comprising adhering to the surface a film comprising of hydrophilic polyurethane which contains from 35 to 60% by weight of water when hydrated and has a thickness of 3 $\mu$m to 50 $\mu$m in its anhydrous state.

In a further aspect therefore the present invention provides a process for forming on at least one surface of a glass substrate an antimist coating of a hydrophilic polymer comprising adhering to the surface a film comprising a hydrophilic polyurethane which contains from 35 to 60% by weight of water when hydrated and has a thickness of 3 $\mu$m to 50 $\mu$m in its anhydrous state.

In a further aspect therefore the present invention provides a process for forming on at least one surface of a plastics substrate an antimist coating of a hydrophilic polyurethane which process comprises immersing the substrate in a solution of the polyurethane, removing the substrate therefrom at a controlled rate and finally removing the solvent by means of a current of air to provide the antimist coating of the polyurethane.

In a further aspect therefore the present invention provides a process for forming on at least one surface of a glass substrate an antimist coating of a hydrophilic polyurethane which process comprises immersing the substrate in a solution of the polyurethane, removing the substrate therefrom at a controlled rate and finally removing the solvent by means of a current of air to provide the antimist coating of the polyurethane.

In an alternative aspect of the present invention the glass or plastics substrate may be coated with more than one polyurethane coating in which the coating adjacent to the substrate has a lower water content when hydrated that that of the second or subsequent layers. The advantage for having more than one coating is two-fold. Firstly polyurethanes of lower water content exhibit greater adherence to the substrate than those of high water content and secondly polyurethanes of high water content adhere to other polyurethanes more strongly when saturated than they do to the substrate. Thus by using at least two different polyurethanes it is possible to provide a coating which takes up a large amount of water while at the same time does not delaminate from the substrate.

Aptly the polyurethanes are those which have been described hereinbefore and which have the required water contents and thicknesses. Suitably the polyurethanes which form the first coating on the substrate will have a water content when hydrated of from 0 to 35% by weight and more suitably 10 to 32% and preferably 20 to 30%. Suitably the polyurethane which may form the second and subsequent coatings will contain when hydrated from 60 to 90% by weight of water, more suitably 65 to 85% water, and preferably 70 to 80% water.

The coatings may be applied in the conventional manner as herein described. The coating of the polyurethane having the lower water content when hydrated being first formed on the substrate and then the second or subsequent coatings being formed on top of the first.

Accordingly the present invention provides a glass substrate which in use is susceptible to misting which has on at least one surface thereof an antimist coating of hydrophilic polymer characterised in that the coating consists of at least two layers the first layer, adjacent to the substrate comprising a polyurethane which contains from 0 to 35% by weight of water when hydrated and has a thickness of 3 $\mu$m to 50 $\mu$m in its anhydrous state and the second and any subsequent layers comprising a polyurethane which contains from 60 to 90% by weight water when hydrated and has a thickness of 3 $\mu$m to 50 $\mu$m in its anhydrous state.

Accordingly the present invention provides a plastics substrate which in use is susceptible to misting which has on at least one surface thereof an antimist coating of hydrophilic polymer characterised in that the coating consists of at least two layers the first layer adjacent to the substrate comprising a polyurethane which contains from 0 to 35% by weight of water when hydrated and has a thickness of 3 $\mu$m to 50 $\mu$m in its anhydrous state and the second and any subsequent layers comprising a polyurethane which contains from 60 to 90% by weight water when hydrated and has a thickness of 3 $\mu$m to 50 $\mu$m in its anhydrous state.

DESCRIPTION 1

Preparation of a Hydrophilic Polyurethane

A polyurethane having potential water content of 45% (by weight) when hydrated was prepared from,

| | |
|---|---|
| Polyethylene glycol (Mol. Wt. 1540) | 154.0 g (0.1 mole) |
| Ethane diol | 18.6 g (0.3 mole) |
| 4,4'-dicyclohexylmethane diisocyanate | 105 g (0.4 mole) |
| Di-n-butyl tin dilaurate | 0.2% w/w |

The polyethylene glycol and ethane diol were weighed into a breaker and gently warmed to mix the polyethylene glycol and diol. The diisocyanate was then added and the mixture stirred until a homogeneous solution was achieved. The catalyst was added and stirring continued for a further minute. The mixture was then poured into a high density polypropylene dish and placed in an oven at 90° C. for 2 hours to cure. The polyurethane so formed was capable of absorbing water to give a water content of 45% when fully hydrate and was soluble in common organic sovents.

Preparation of a Hydrophilic Polyurethane

A polyurethane having a potential water content of 45% (by weight) when hydrated was prepared from,

| | |
|---|---|
| Polyethylene glycol Mol. wt. 1486) | 300.68 g |
| Ethanediamine | 24.28 g |
| 4,4'-dicyclohexyl methane diisocyanate | 175.03 g |
| Di-n-butyl tin dilaurate | 0.2% (w/w) |
| Methylene dichloride | 1125.00 ml |
| Isopropyl alcohol | 375.00 ml |

Preparation of Hydrophilic Polyurethane

A polyurethane having a potential water content of 65% by weight when hydrated was prepared from:

| | |
|---|---|
| Polyethylene glycol (M W 6000) | 60 g (0.01 mole) |
| Ethanediol | 7.44 g (0.12 mole) |
| 4,4'dicyclohexylmethane diisocyanate | 33.5 g (0.13 mole) |
| Di-n-Butyl tin dilaurate | 0.2% w/w |

Preparation of a Hydrophilic Polyurethane

A polyurethane having a potential water content of 90% by weight when hydrated was prepared from:

| | |
|---|---|
| Polyethylene glycol (M W 8360) | 83.6 g (0.01 mole) |
| Butanediol | 0.18 g (0.005 mole) |
| 4,4'dicyclohexylmethane diisocyanate | 5.64 g (0.018 mole) |
| Di-n-butyl tin dilaurate | 0.2% w/w |

EXAMPLE 1

A solution of a hydrophilic polyurethane (which contains 45% by weight water when hydrated) was formed by dissolving the polyurethane (600 g) in a solvent (10 liters) comprising a mixture of industrial methylated spirits (IMS) and 2-methoxyethanol in a ratio of 3:1 by stirring the polyurethane and solvent together in a glass or polyethylene vessel for 24 hours. At the end of this period the solution was filtered to remove any insoluble particles which might impair the finished coating. The filtered solution was placed in a clean glass dipping tank mounted on vertically movable platform which was enclosed in a dust free environment.

A substrate in the form of visor formed from polycarbonate was cleaned to remove any grease by immersion in isopropanol and followed by blasting the surface with jets of high pressure air. The dipping process was carried out in a dust free environment. The visor was attached to a frame above the dipping tank by hooks or suspending clip. The platform on which the dipping tank stood was slowly raised to immerse the visor in the 6% polymer solution. The rate of immersion is controlled and was 1 cm/minute in this example. The immersion was stopped before the solution reached the suspending clip, otherwise unslightly drain marks can be caused on the surface of the visor. When the correct level of immersion has been reached, the dipping tank is allowed to descend under controlled conditions, for example by using a bleed valve. The rate at which the visor is extracted from the tank governs the coating thickness. Clearly the rate may be varied during the withdrawal process to provide a coating of different thicknesses and to avoid build up of polymer at the bottom edge of the visor. In this example the extraction rate was 16 seconds/cm initially, reduced to 30 seconds/cm for the last 2 cm.

After extraction from the solution, any remaining drops of solution were allowed to fall and the visor was then transferred to a warm-air oven when a current of air at 50° C. removed any residual solvent. The drying process takes from 2 to 5 minutes. The visor was further dried on an upward stream of air at ambient temperature for a further 5 minutes. The coating formed on both sides of the visor did not show any sign of cloudiness.

The coating showed good adhesion to the substrate when both wet and dry. The coating was saturated with distilled water and subjected to shear. No break up of the coating was observed.

The antimist properties of the coating was tested by applying moist air to the coated surface and to an uncoated surface and observing the time taken for the mist to clear in each case. This was carried out at three difference temperatures 20° C., 0° C. and −25° C. The coated visor cleared at all three temperatures significantly more quickly than the uncoated visor.

The coating upon visual inspection showed no optical aberations.

EXAMPLE 2

A visor is coated on one surface in a similar process to that described in Example 1 by masking one side of the visor with a prevulcanised rubber latex. The latex coat is stripped off after the immersion and withdrawal cycle into the hydrophilic polyurethane solution has been completed.

The coating on one surface shows the desired properties of adhesion and antimisting.

EXAMPLE 3

A solution of a hydrophilic polyurethane (which contains 26% by weight of water when hydrated and prepared as described in Example 2 of British Patent Application No. 2093190) is formed by dissolving the polyurethane (600 g) in a sovlent (10 liters) comprising a mixture of industrial methylated spirits and 2-methoxyethanol in a ratio of 3:1. A polycarbonate visor is then coated using the method described in Example 1. When the first coating is dry a second coating is placed on top of the first using a solution of a second hydrophilic polyurethane (which contains 85% by weight water when hydrated).

The two-layer coating provides a clear, transparent visor which may absorb into its outer layer a large amount of water but which does not become detached from the substrate.

EXAMPLE 4

A sheet of polyester, Melinex, was coated on one surface in a similar manner to that described in Example 2. The polyester sheet may then be used as a glazing panel in a greenhouse whereby the hydrophilic polyurethane coating faces into the interior of the greenhouse.

EXAMPLE 5

A solution of a hydrophilic polyurethane was formed by the process described in Example 1 except that the solution additionally contained 100 g of Union Carbide A-187 (silane coupling agent).

A substrate in the form of a piece of safety glass was cleaned to remove any grease by immersion in isopropanol, followed by blasting the surface with jets of high pressure air. The substrate was then coated by the immersion process described in Example 1.

After the final drying step, the coated glass showed improved antimist properties compared to uncoated glass. The coating when saturated showed adequate adhesion to the glass.

EXAMPLE 6

A solution of a hydrophilic polyurethane (which contains 26% by weight of water when hydrated and prepared as described in Example 2 of British Patent Application No. 2093190) is formed by dissolving the polyurethane (600 g) in a solvent (10 liters) comprising a mixture of industrial methylated spirits and 2-methoxyethanol in a ratio of 3:1. A polycarbonate visor is then coated using the method described in Example 1. When the first coating is dry a second coating is placed on top of the first using a solution of a second hydrophilic polyurethane (which contains 85% by weight water when hydrated).

The two-layer coating provides a clear, transparent visor which may absorb into its outer layer a large amount of water but which does not become detached from the substrate.

What is claimed is:

1. A plastics substrate which in use is susceptible to misting which has on at least one surface thereof an antimist coating of a hydrophilic polymer in which the coating is formed from a hydrophilic polyurethane which contains from 35 to 60% by weight of water when hydrated and has a thickness of 3 $\mu$m to 50 $\mu$m in its anhydrous state.

2. A plastics substrate according to claim 1 in which the substrate is a polycarbonate film.

3. A plastics substrate according to claim 1 in which the substrate is a polyester film.

4. A plastics substrate which in use is susceptible to misting which has on at least one surface thereof an antimist coating of hydrophilic polymer in which the coating consists of at least two layers, the first layer adjacent to the substrate comprising a polyurethane which contains from 0 to 35% by weight of water when hydrated and has a thickness of 3 $\mu$m to 50 $\mu$m in its anhydrous state and the second and subsequent layers comprising a polyurethane which contains from 60 to 90% by weight water when hydrated and has a thickness of 3 $\mu$m to 50 $\mu$m in its anhydrous state.

* * * * *